United States Patent
Zellmer

[11] 4,027,259
[45] May 31, 1977

[54] LINE EQUALIZER WITH DIFFERENTIALLY CONTROLLED COMPLEMENTARY CONSTANT RESISTANCE NETWORKS

[75] Inventor: Neale A. Zellmer, Belmont, Calif.

[73] Assignee: GTE Automatic Electric Laboratories Incorporated, Northlake, Ill.

[22] Filed: June 14, 1976

[21] Appl. No.: 695,699

[52] U.S. Cl. .............................. 333/28 R; 178/45; 179/2.5 R; 179/16 F

[51] Int. Cl.² ..................... H03H 7/14; H04B 3/14

[58] Field of Search ........... 333/18, 28 R; 307/264; 179/2.5 R, 15 AE, 15 BP, 16 F, 170 R, 170 A, 170 D, 170 T; 178/45, 46; 330/26, 28, 75, 86, 151

[56] References Cited
UNITED STATES PATENTS

| | | | |
|---|---|---|---|
| 2,096,027 | 10/1937 | Bode | 333/28 R |
| 2,981,892 | 4/1961 | Franks et al. | 333/28 R X |
| 3,444,474 | 5/1969 | Borenstein et al. | 333/28 R X |
| 3,646,464 | 2/1972 | Boggs | 333/28 R X |
| 3,715,679 | 2/1973 | Fleischer | 333/28 R X |
| 3,753,140 | 8/1973 | Feistel | 333/28 R X |
| 3,800,265 | 3/1974 | Yoshioka et al. | 333/28 R |
| 3,806,839 | 4/1974 | Iwakami | 333/28 R |

Primary Examiner—Paul L. Gensler
Attorney, Agent, or Firm—Russell A. Cannon; Leonard R. Cool

[57] ABSTRACT

In a system employing half-span preemphasis of transmitted signals on a cable pair telephone line, equalization is accomplished in a circuit arrangement including first and second complementary constant-resistance networks having the input impedances thereof in the emitter and collector circuits, respectively, of a common emitter amplifier. These impedances control the feedback and gain of the amplifier such that their effects are additive in a particular manner in the collector-output circuit thereof. The terminating resistances of the networks are the resistances produced by a pair of differentially controlled thermistors. A DC error signal that is proportional to line length controls the current driving the thermistors and thus the resistances thereof. When the circuit arrangement is at half-span spacing, a difference circuit causes the terminating resistances of the thermistors to be the same values, which make the impedance characteristics of the networks such that the net gain of the amplifier is flat. When the circuit arrangement is located at other than half-span spacing, the terminating resistances presented by the thermistors are different values, which cause the impedance characteristics of the networks to vary in a prescribed manner. The effects of these networks are additive in the amplifier so as to make the overall loss of the system flat.

16 Claims, 8 Drawing Figures

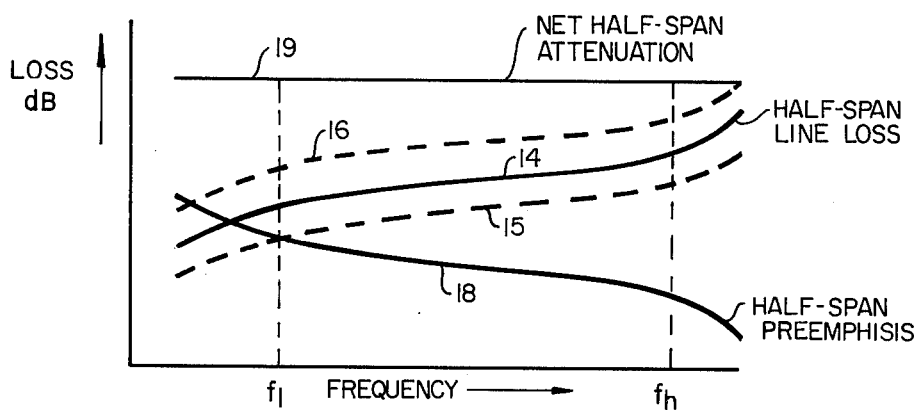
*Fig-2-*
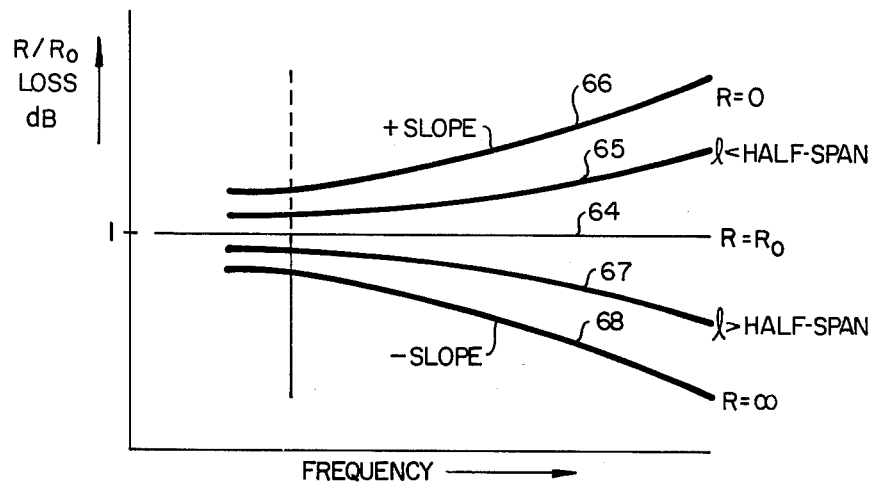
*Fig-3-*
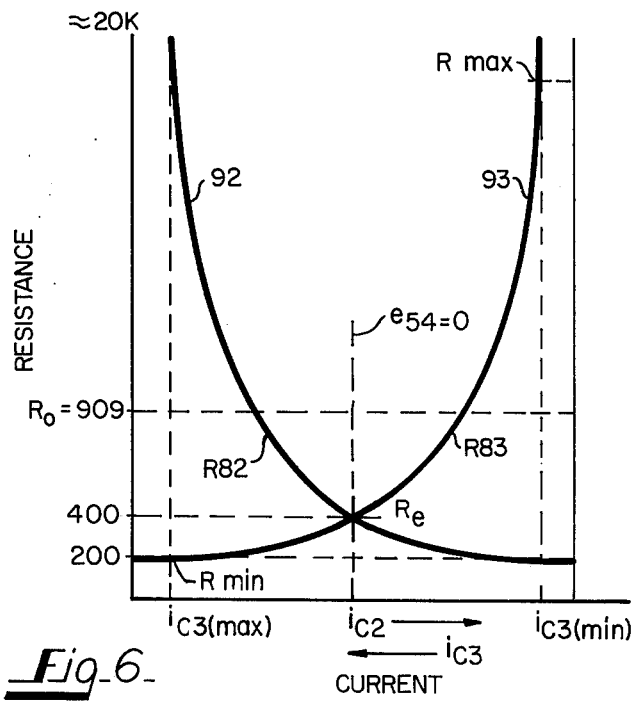
*Fig-6-*

LINE EQUALIZER WITH DIFFERENTIALLY CONTROLLED COMPLEMENTARY CONSTANT-RESISTANCE NETWORKS

BACKGROUND OF INVENTION

This invention relates to variable line equalizers and line build-out networks (LBO's) for subscriber carrier transmission systems and more particularly to such circuitry employing a pair of complementary constant-resistance networks (CRN's) that are terminated by differentially controlled variable resistors.

The transmission of voice signals over subscriber carrier circuits requires that the transmission characteristic of a channel, including the communication medium which may be a twisted-pair telephone cable, be sufficiently uniform that there is a minimum distortion of information being transmitted. It is well known, however, that the attenuation characterisitcs of a telephone cable change with signal frequency and the length of a line. It is necessary therefore to employ equalizers and/or line build-out networks to equalize the channel by introducing certain amounts of attenuation in selected portions of the signal frequency spectrum to compensate for the nonuniform attenuation introduced by the cable pair. Stated differently, the attenuation characteristic of the equalizer must be complementary to that of the unequalized channel so that the sum of decibel measures of these attenuations is approximately constant with frequency, i.e., so that the resultant attenuation characteristic in the channel is flat. Although this means that the resultant signal level is reduced, this loss in signal can be compensated for in an amplifier.

Various types of equalizers and line build-out networks have been employed for accomplishing this function. Bode-type equalizers are three-port networks which are often employed in these applications. They are described in U.S. Pat. No. 2,096,027 by H. W. Bode, filed Jan. 30, 1936 and issued Oct. 19, 1937, and the article, "Variable Equalizers" by H. W. Bode, pp. 229 – 244, The Bell System Technical Journal, vol. 17, No. 2, April 1938. Although such equalizers often employ only passive elements and a single resistor as a variable impedance element, active Bode-type equalizers are also available as are such networks employing the combination of a constant resistance network (CRN) and a variable resistor as the variable impedance element. CRN's are also employed as variable equalizers. Such networks are generally described in the Bode U.S. Pat. No. 2,096,027 and in the articles, "Distortion Correction in Electrical Circuits with Constant Resistance Recurrent Networks" and "Theory and Design of Uniform and Composite Electric Wave Filters", both by Otto J. Zobel, The Bell System Technical Journal, pp. 438 – 534, vol. 7, No. 3, July 1928 and pp. 1 – 46, vol. 2, No. 1, January 1923, respectively. A CRN is essentially a two-port network which is comprised of resistors and one or more pairs of inverse networks of constant impedance product. In a CRN having one port terminated by a resistance $R_o$ which is equal to this product, the image impedance across the other port is also equal to $R_o$ and is constant over a frequency band where the terminating resistance remains constant and equal to $R_o$. In a CRN of appropriate design, its attenuation characteristic is complementary to that of a cable pair or other type of transmission medium when the former is terminated by a resistance other than $R_o$ that is related to the line length. It is known that the variable terminating resistance of the CRN may be produced by an electronically controlled element such as a thermistor. Such networks provide a limited range of equalization. A different type of equalizer is described in the U.S. Pat. No. 3,806,839 by Takuya Iwakami, filed Dec. 12, 1972 and issued Apr. 23, 1974.

SUMMARY OF INVENTION

An object of this invention is the provision of an improved variable equalizer circuit embodying constant resistance networks.

In accordance with this invention, an adjustable equalizer comprises a circuit arrangement including first and second complementary constant resistance networks in the forward gain and feedback loops, respectively, of an active element. The networks are terminated by associated variable resistance elements which are differentially controlled by signals that are a function of the length of a transmission medium. The impedance characteristics of the networks are additive in this arrangement in a manner such that the net gain of the active element is the inverse of the attenuation characteristic of the transmission medium, and the overall loss characteristic is constant.

BRIEF DESCRIPTION OF DRAWINGS

This invention will be more fully understood from the following detailed description of preferred embodiments thereof incorporated in a single-sideband resonant-transfer subscriber carrier multiplex telephone system wherein:

FIG. 2 is curves illustrating the attenuation characteristics of a cable pair transmission line;

FIG. 3 is curves that are normalized with respect to $R_o$ and which illustrate the operation of circuitry embodying this invention.

FIG. 6 is curves illustrating the resistance characteristics of thermistors;

DESCRIPTION OF PREFERRED EMBODIMENTS

Figure 1:
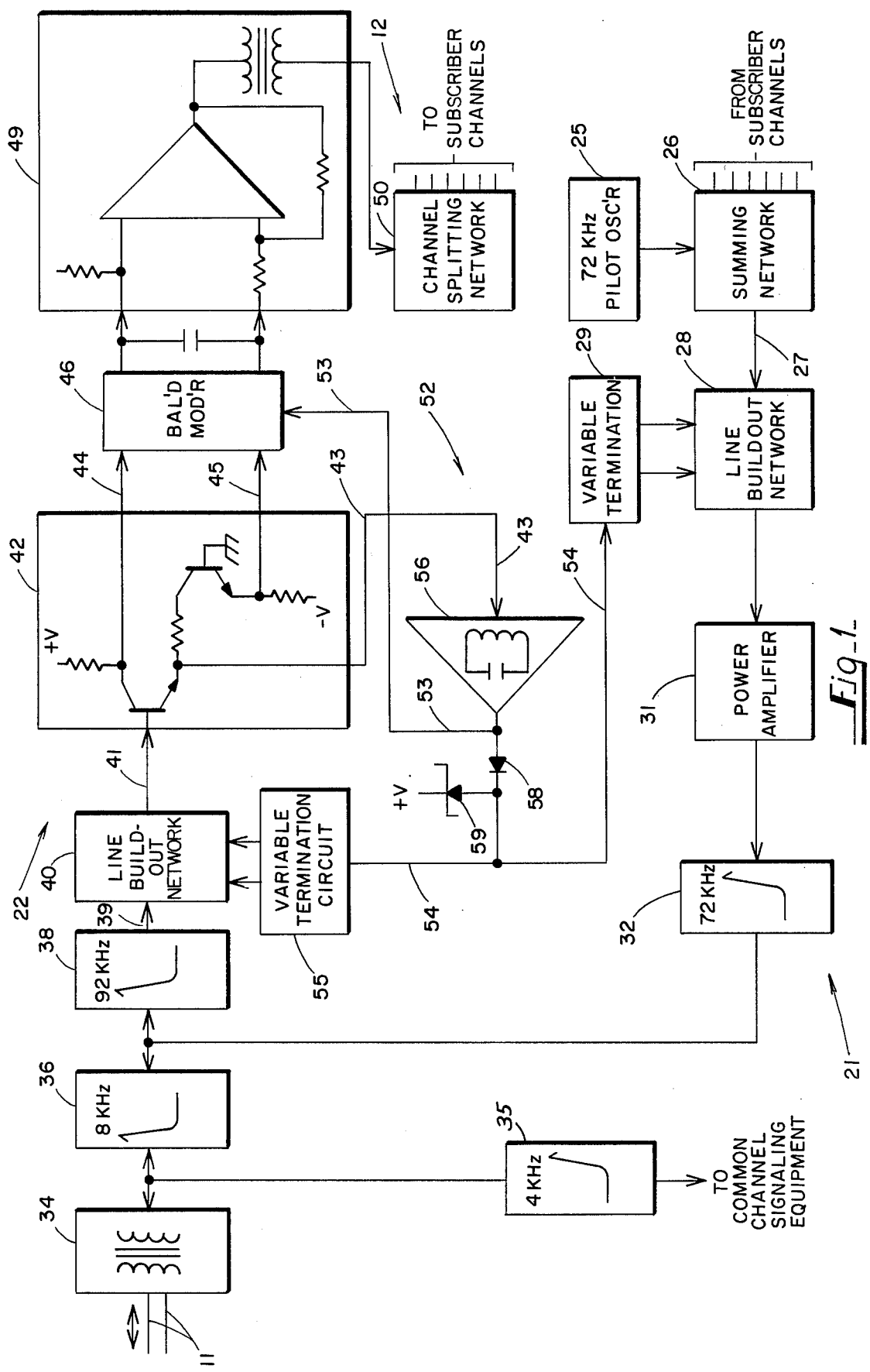
FIG. 1 is a schematic block and circuit representation of subscriber terminal equipment 12 in a subscriber carrier system and embodying this invention.

A single-sideband, resonant-transfer subscriber carrier multiplex system embodying this invention is described in the publications, "A 48-Channel Subscriber Multiplex System Using Resonant Transfer Modulation" by Lawrence E. Getgen, and "Line Equipment for a Subscriber Multiplex Using Resonant Transfer Modulation" by Neale A. Zellmer, Conference Record of the International Conference on Communications (ICC 1975), June 16–18, 1975 in San Francisco, Calif., pp. 8–10 to 8–14 and 8–15 to 8–19, respectively, the latter article being incorporated herein by reference. The subscriber terminal line equipment 12 in FIG. 1 for such a system is connected through a cable pair 11, for example, to central office equipment (not shown). The attenuation characteristic for line 11, when subscriber terminal 12 is located at half-span spacing, is represented by curve 14 in FIG. 2. The curves 15 and 16 represent this loss characteristic when the terminal 12 is spaced at less than and greater than half-span, respectively.

In the central office equipment of this system, low-frequency group signals are generated and are translated to high-frequency group signals which are combined with a 160 kHz pilot signal. The transmission level of this pilot signal is controlled in the central office so that it can be used to synchronize and regulate circuitry in the subscriber terminal. The combined high group and pilot signals are preemphasized with half-span slope in the central office prior to transmission on line 11 to the equipment 12 in a subscriber terminal. This preemphasis makes it easier to later exploit the positive and negative slope control of the input impedance of constant resistance networks in a variable equalizer embodying this invention, as is described more fully hereinafter.

The subscriber terminal 12 generally comprises a transmit section 21, receive section 22, and common channel signaling equipment which is conventional and not shown here. In the transmit section 21, signals from a subscriber channel and a 72-kHz pilot signal oscillator 25 are combined in a summing network 26 to produce a low-group signal on line 27. The transmission level of this signal is adjusted by correlative control and preemphasized in a line build-out network 28, amplified by circuit 31, shaped by the 72-kHz lowpass filter 32, and transmitted on the cable pair 11 to the central office equipment. The 72-kHz pilot signal is extracted from this low-group signal in the central office and used to regulate the receive level.

Signaling information and high-group signals on cable pair 11 are coupled through hybrid 34 and are separated by the 4-kHz lowpass filter 35 and the 8-kHz highpass filter 36 and passed thereby to associated circuitry. The low-group signal from filter 32 in the transmit section 21 is passed by the highpass filter 36 to line 11, of course, but is blocked from the signaling equipment and receive channel 22 by associated filters 35 and 38. Finally, the high-group signal from line 11 is also blocked from the transmit section 21 by the lowpass filter 32 and is passed to the receive section 22 by the 92-kHz high-pass filter 38 on the input thereof.

The receive section 22 comprises the series combination of the high-pass filter 38, line build-out network 40, bridging amplifier and phase splitter 42, balanced modulator 46, power amplifier 49, and a channel splitter network 50, for equalizing and demultiplexing received signals. The receive section 22 also includes a feedback network 52, which is responsive to a portion of the equalized signal on line 43 for producing a 160-kHz pilot signal control voltage one line 53 and a DC error voltage on lines 54. This error voltage on the lines 54 adjusts the values of impedances in circuits 55 and 29 which provide terminations for associated build-out networks 40 and 28.

Briefly, the line build-out network 40 adjusts the level of the high-group signal in a manner which is generally illustrated by the curves in FIG. 3 and described more fully hereinafter. The circuit 42 comprises a pair of transistor amplifiers which bridge a portion of the equalized signal on line 41 onto the output line 43 and which produces balanced push-pull high-group signals on lines 44 and 45. The amplified signal on line 43 is applied to a pilot pick-off amplifier 56, which includes a notch filter that passes only the 160-kHz pilot signal. The amplified pilot signal on line 53 is used in balanced modulator 46 to translate the high-group signals on lines 44 and 45 back to the low-frequency group signals which were originally available in the central office equipment. These low-group signals are amplified in circuit 49 and delivered by channel splitting network 50 to associated subscriber channels. The 160-kHz signal from the pilot pick-off amplifier 56 is also rectified in a linear rectifier circuit represented by diode 58 and is compared with a reference voltage produced by a Zener diode 59 to produce the DC error voltage signal on lines 54, which is proportional to the length of the transmission line 11.

A constant resistance network (CRN) is basically a two-port device having one port terminated by a variable resistor and comprising one or more inverse impedance networks which have impedances that are a function of the inverse impedances $Z_{11}$ and $Z_{21}$ of inverse networks $z_{11}$ and $z_{21}$ which satisfy the relationship $Z_{11} Z_{21} = R_o^2$ for all frequencies in a frequency band. A bridged T-type CRN 60 of conventional design is illustrated in schematic form in FIG. 4, corresponding lattice-type CRN's also being available. The properties and design of CRN's are described in articles including the aforementioned ones by Zobel and Bode. When one port 62 of this CRN 60 is terminated in the proper load resistance $R = R_o$, the image impedance $Z_t$ reflected across the network to the other port 63 is the same resistance $R_o$, which is independent of frequency across some frequency band, i.e., the impedance characteristic of the CRN 60 is flat (see curve 64 in FIG. 3). When the terminating resistance R is varied from this value $R_o$, the image impedance $Z_t$ vs. frequency characteristic of CRN 60 changes in a prescribed and predictable manner. The curves 65 and 66 represent the input impedance of the CRN 60 as the terminating resistance decreases from the value $R_o$ to 0 ohms. Conversely, the curves 67 and 68 represent the input impedance of CRN 60 as the terminating resistance is increased from the value $R_o$ to infinite resistance. By properly selecting values of elements making up the inverse networks $z_{11}$ and $z_{21}$ and other elements of the CRN as is known in the art, the reflected impedance $Z_t$ may be made to vary in a prescribed manner, which is the complement of the loss characteristic of a length of cable pair 11 or other type of transmission line (curves 14 – 16 in FIG. 2). Associated curves 65 and 67 and curves 66 and 68 illustrate the plus and minus symmetry provided by a CRN as its terminating resistance is increased and decreased, respectively, at the same rate from the value $R_o$. It has been found that the correction provided by a single CRN is not sufficient to equalize a line 11 for a full span of 45 dB length.

Figure 5:
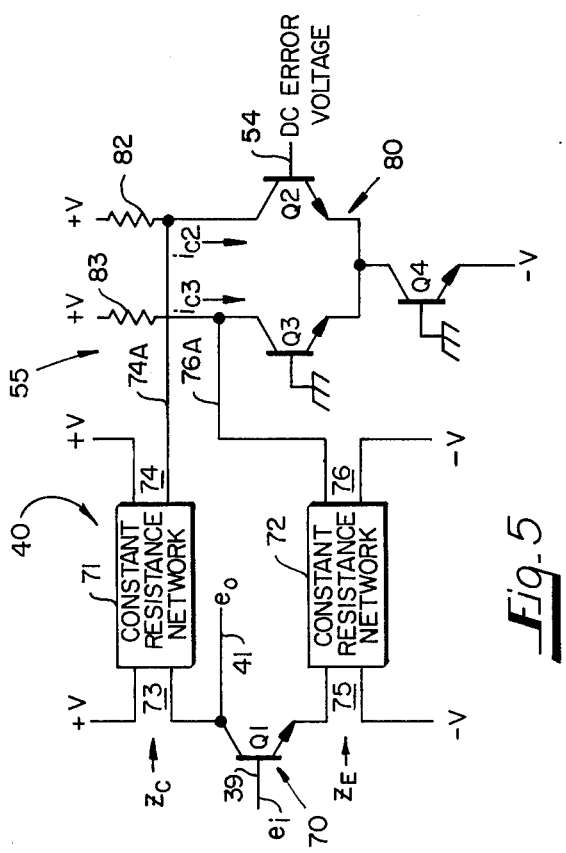
FIG. 5 is a schematic and block diagram of the line build-out network 40 and variable termination circuit 55 in FIG. 1.

In accordance with this invention, a larger amount of equalization is obtained with the line build-out network (LBO) 40 and terminating circuit 55 in FIG. 5 than is available with a single CRN. As stated previously, the system employs preemphasis for half-span equalization. The LBO 40 here comprises a variable gain feedback stabilizer amplifier 70 that is represented by the transistor Q1 and a pair of constant resistance networks (CRN's) 71 and 72 having complementary impedance characteristics in the forward and feedback loops, respectively, of the amplifier. By complementary it is meant that the impedance characteristics of CRN's 71 and 72 are essentially similar, although of opposite slope. An unequalized signal $e_i$ on line 39 is applied to the Q1 base electrode, an equalized signal $e_o$ being coupled on line 41 from the Q1 collector electrode. The CRN 71 has an input impedance $Z_C$ looking into the one port 73 thereof, which is connected between the Q1 collector electrode and the positive supply voltage +V. The other CRN 72 has an input impedance $Z_E$ looking into the corresponding port 75 thereof, which is connected between the Q1 emitter electrode and the negative supply voltage −V. The other ports 74 and 76 of the CRN's are terminated by elements of circuit 55.

The variable termination circuit 55 comprises a pair of thermistors 82 and 83 in the collector circuits of associated transistors Q2 and Q3 of a differential amplifier 80. The emitter electrodes of the differential amplifier 80 are driven by a constant current source represented by transistor Q4. The bias circuits associated with transistors Q1 − Q4 are omitted from FIG. 5 for simplicity of illustration. The Q2 base electrode receives the DC error voltage on line 54, which is produced by rectification of the 160-kHz pilot signal. This error voltage is proportional to the length of the line 11. The Q3 base electrode is connected to ground. The collector electrodes of these transistors Q2 and Q3 are connected to terminals 74A and 76A of associated ports of the CRN's. Thus, the networks 71 and 72 are terminated by the associated thermistors 82 and 83. Since thermistors 82 and 83 are in the collector circuits of transistors that are driven differentially, the collector currents $i_{C2}$ and $i_{C3}$ in these thermistors cause the resistances thereof to essentially vary directly and inversely as the length of the line 11.

Figure 4:
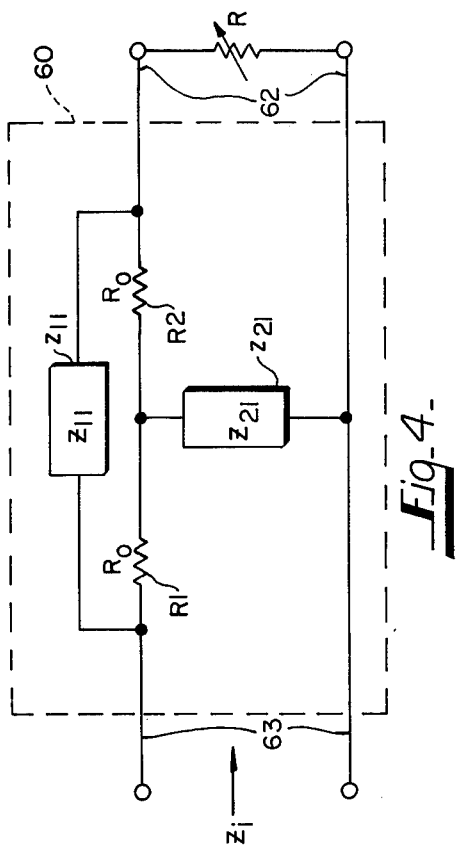
FIG. 4 is a schematic circuit representation of a constant resistance network 60.

Consider that the CRN's 71 and 72 are represented by the circuit in FIG. 4 and are normalized with respect to a resistance $R_o$. Here, $Z_1 Z_2 = R_o^2 = 1$, where $Z_1 = Z_{11}/R_o$ and $Z_2 = Z_{21}/R_o$. It can be shown in this instance that the reflected impedance $Z_C$ in the collector CRN 71 is representable as $$Z_C = \frac{\frac{2k}{1+k} + M(f)}{\frac{2}{1+k} + M(f)} \quad (1)$$

where $M(f) = Z(Z+2)$, $Z = Z_1 - 1/Z_2$, $R = kR_o$, and $k$ is a variable. If $k = 1$, then $Z_C = R_o/R_o = 1$ as is expected. If the terminating resistance $R = k'R_o$ for the other CRN 72, where $k' = 1/k$, then it can also be shown that the reflected impedance $Z_E$ in the emitter CRN 72 is representable as $$Z_E = \frac{\frac{2}{1+k'} + M(f)}{\frac{2k'}{1+k'} + M(f)} = \frac{1}{Z_C}. \quad (2)$$

This means that where $k = 1$, the networks are terminated in their associated characteristic impedances and have input impedances represented by curve 64. The values of $k$ and $k'$ vary, of course, in order to make the impedance characteristics of the two networks 71 and 72 different from the curve 64 and the slopes thereof other than zero. In this instance, where $k$ is different from 1, the input impedances $Z_C$ and $Z_E$ of the networks are a function of frequency, i.e., they are not constant. The curves 66 and 68 illustrate the shape of the input impedance $Z_C$ for $k < 1$ and $k > 1$, respectively. Conversely, these curves 66 and 68 illustrate the shape of the input impedance $Z_E$ for $k' > 1$ and $k' < 1$, respectively. For particular values of terminating resistances R ≠ $R_o$ such that k ≠ k' ≠ 1 and $k = 1/k'$, then the impedance characteristic 65, for example, of network 71 has a positive slope with respect to frequency, whereas the corresponding impedance characteristic 67 of network 72 has an equal and opposite slope. It has been found that the impedance characteristics of the two CRN's will be substantially complementary, even if k' does not track 1/k exactly, i.e., if $k' \neq 1/k$ for all values thereof. As long as k and k' move in opposite directions, the effects of CRN's 71 and 72 in LBO 40 are additive in some manner in the Q1 collector circuit.

Since the feedback of amplifier 70 is very large, the voltage gain V.G. thereof is inversely proportional to the feedback which is controlled by the impedance $Z_E$, i.e., $$V.G. = 1/Z_E. \quad (3)$$

The attenuation gain of the amplifier, however, is directly proportional to the impedance $Z_C$. Thus, the net voltage gain V.G.$_{net}$ of amplifier 70 is approximately equal to the ratio of the input impedances of networks 71 and 72 and is representable as $$V.G._{net} = Z_C/Z_E = Z_C^2. \quad (4)$$

This means that for such a circuit the decibel measure of the dynamic range of the LBO 40 is double that available from a single CRN. Where $k = 1$, then $Z_C = 1$ and the net gain of amplifier 70 is unity. Where $k \neq 1$, then amplifier 70 effectively inverts one of the curves 65 and 67, for example, and adds them together to produce the net gain in equation (4). The curves 65 and 67, for example, also generally illustrate a net positive gain and net attenuation (or negative gain), respectively, provided by amplifier 70.

Since the subscriber terminal 12 and LBO 40 are preemphasized for half-span spacing, only ± half-span compensation is required for full-span equalization. It is then possible to locate a subscriber terminal at a spacing of ± half-span from the half-span location and still obtain the desired equalization. With two CRN's in the LBO 40 here, each of the CRN's 71 and 72 need only provide ± quarter-span compensation. Noting the plus/minus symmetry of the impedance characteristics of the CRN's, it is seen that the LBO 40 truly provides gain in both directions (i.e., either gain or attenuation) as is required for effecting the desired automatic equalization in a system where a subscriber terminal 12 is located at ± half-span from the half-span location.

When appropriate values of elements of the CRN's 71 and 72 are chosen, the shapes of the impedance characteristics thereof will be similar to that of line 11 such that the decibel measure of the net line loss (including preemphasis) will be substantially the complement of the sum of the decibel measure of the impedance characteristic of CRN 71 and the reciprocal of the impedance characteristic of CRN 72. This design is accomplished in practice by first measuring the loss characteristic of a particular transmission line 11 as a function of frequency. Constant resistance networks are then designed having a prescribed characteristic impedance and having impedance characteristics that track the line loss characteristic for some values of terminating resistance. Finally, an electrically variable resistive element, for example, having a resistance which varies as a function of a control signal that is proportional to the length of line 11 at some rate is selected. Such an element may, for example, be one or more thermistors or semiconductor diodes.

The description in the first three of the four preceding paragraphs was essentially based on the assumption that the CRN's 71 and 72 have terminating resistances that vary reciprocally from a value $R = R_o$ for which the impedance characteristic of each network is flat, see curve 64. The resistances provided by thermistors, however, vary with control current in a manner shown in FIG. 6. The curves 92 and 93 represent the impedance characteristics of thermistors 82 and 83, respectively, in FIG. 5. Although the resistance provided by one thermistor increases as the resistance provided by the other decreases, they do not necessarily track each other such that the resistance of thermistor 82 is always equal to the reciprocal of the resistance of thermistor 83. In arriving at an LBO 40 in a practical implementation of this invention, the CRN's 71 and 72 are designed to have a prescribed characteristic impedance that tracks the loss characteristic of line 11 for some terminating resistance between the minimum and maximum values thereof that are obtainable from a thermistor having a desired dynamic range in the order of about 23 dB. Maximum and minimum resistances of the thermistors are selected for a nominal minimum current $i_{C3(min)}$ at the maximum ambient temperature to be encountered and for a nominal maximum current $i_{C3(max)}$, respectively. The characteristic impedances $R_o$ of the CRN's are approximately equal to the geometric mean between these minimum and maximum resistances of the thermistors. The resistances of the two thermistors are the same values $R_e$ for the error signal voltage $e_{54} = 0$. Although the impedance characteristic of the two CRN's will not be flat when the terminating resistances are the same value $R_e$ for $e_{54} = 0$ volts, they will be the same shape and have slopes of the same sign. Thus, when these two impedance characteristics are combined in amplifier 70 according to equation (4), the net voltage gain of the amplifier will be flat. As the resistance of the thermistors vary from this value $R_e$, the impedance characteristics of the networks move in opposite directions such that the net gain of the amplifier still tracks the loss characteristic of line 11 and provides the desired equalization.

Figure 7:
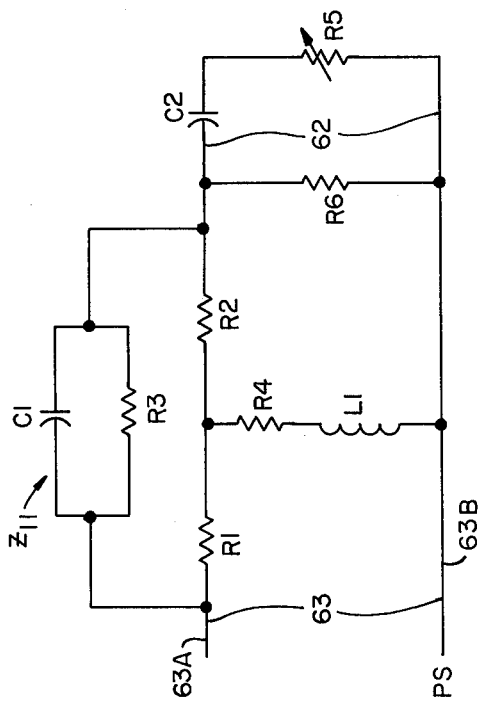
FIG. 7 is a detailed circuit diagram of one form of the constant resistance networks 71 and 72 in FIG. 5.

In a line build-out network that was built and successfully operated, CRN's 71 and 72 were bridged-T devices of the type illustrated in FIG. 4 and shown in detail in FIG. 7. Each CRN provided correction in one direction for a quarter-span spacing. Thus, two CRN's usable in both directions (both providing plus and minus gain), where there is half-span preemphasis, provide for full-span equalization. The two CRN's 71 and 72 in this LBO were identical. The resistors R1 and R2 were the resistors in the series arm of the T-structure having values that are equal to the resistance $R_o$. The bridging network $z_{11}$ comprised the parallel combination of a capacitor C1 and resistor R3. The inverse network $z_{21}$ in the shunt arm of the T-structure comprised the resistor R4 and inductor L1, which were connected in series. The one-port 62 of the network was terminated by a variable resistor R5, which was a thermistor. A capacitor C2 was connected between one side of thermistor R5; and the bridging network $z_{11}$ to block DC current. A resistor R6 was effectively connected in shunt with thermistor R5 to limit the maximum attainable termination resistance. In this LBO 40, the terminals 63A of the other port 63 of networks 71 and 72 were connected to the Q1 collector and emitter electrodes, respectively. The other terminals 63B thereof were connected to associated supply voltages. The networks 71 and 72 in this LBO, for operating over a frequency band of 92–160 kHz on 22-gauge twisted-pair telephone cable had the following element values:

| | | |
|---|---|---|
| R1 | | 909 ohms |
| R2 | | 909 ohms |
| C1 | | 0.01 microfarads |
| R3 | | 562 ohms |
| R4 | | 1470 ohms |
| L1 | | 8 millihenries |
| L5 | $R_o =$ | 909 ohms |
| | $R_{min} \cong$ | 200 ohms |
| | $R_{max} \cong$ | 4000 ohms |
| C2 | | 0.47 microfarads |
| R6 | | 13.3 kohms. |

The thermistors 82 and 83 in this LBO 40 were GB43V1 devices, manufactured by Fenwal Electronics, Farmingham, Mass. An LBO for operating with 24 and 26-gauge twisted-pair telephone cable was similar, except that element values were changed to tailor impedance characteristics of the CRN's to those of the line. The CRN's for the LBO 28 were also similar to the above, except that element values were changed for operating over a different frequency band.

The LBO 40 in the above example was designed to operate at nominal half-span spacing. If the subscriber terminal 12 including LBO 40 is located at exactly half-span, the loss characteristic of line 11 corresponds to curve 14 in FIG. 2. The DC error voltage $e_{54}$ on line 54 in this instance is 0 volts, for example, and the thermistors 82 and 83 provide resistances that are equal to $R_e$ such that the impedance characteristic of the LBO is flat as is the net loss characteristic of the line.

If the length of cable pair 11 is greater than half-span, the loss characteristic thereof may correspond to that of curve 16. This means that the error voltage on line 54 decreases or is negative and causes the collector currents $i_{C2}$ and $i_{C3}$ to decrease and increase, for causing the terminating resistances R82 and R83 of thermistors 82 and 83 to increase and decrease, respectively. The impedance characteristics of networks 71 and 72 are therefore generally similar to curves 67 and 65, respectively, such that LBO 40 effectively adds positive gain to the line loss to make the net loss characteristic flat. Conversely, if the length of line 11 is less than half-span, corresponding to a loss characteristic such as curve 15, a positive error voltage on line 54 causes the collector current $i_{C2}$ to increase so as to decrease the associated resistance of thermistor 82. The differential operation of amplifier 80 then causes the resistance of thermistor 83 to increase accordingly. In this instance, the impedance characteristics of the networks 71 and 72 are generally similar to the curves 65 and 67, respectively, such that the network 40 in this instance adds positive attenuation or additional loss to the signal on line 39 in order to make the net loss characteristic of the system flat.

Figure 8:
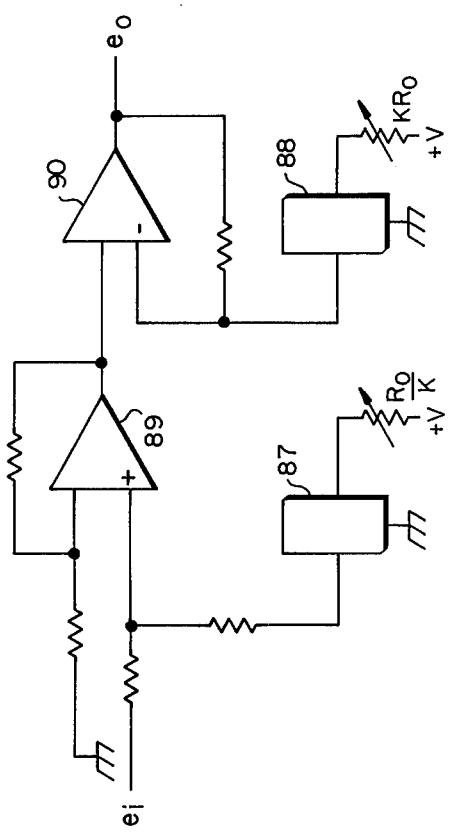
FIG. 8 is a schematic circuit diagram of an alternate embodiment of this invention.

Although this invention is disclosed in relation to a preferred embodiment thereof, variations and modifications will be apparent to those skilled in the art, without departing from the spirit of this invention. For example, the CRN's may be more complex devices than are illustrated in FIGS. 4 and 7. Also, the CRN's may comprise lattice structures instead of bridged-T type devices. Furthermore, the inverse networks may comprise groups of elements other than and/or more complex than those mentioned above. Additionally, the amplifier Q1 may be a bootstrap or Darlington compound and the CRN's may be in other than the collector or emitter circuits of a transistor. An alternate structure in FIG. 8 includes a pair of CRN's 87 and 88 associated with separate operational amplifier circuits 89 and 90. The CRN 87 is in the forward gain loop of amplifier 89, whereas the other CRN 88 is in the feedback loop of amplifier 90. Both of these CRN's 87 and 88 still require complementary impedance characteristics. In this arrangement, the CRN's are again terminated by variable resistors having resistances varying inversely. Additionally, although this invention is described in relation to a system including preemphasis, post-emphasis could also be employed. Further, the net voltage gain of amplifier 70 may be made to more nearly approximate the reciprocal of the line loss at high frequencies by adding a small resistance in series with the capacitor C1. To keep the integrity of the constant resistance network design, it then becomes necessary to add a large resistance in parallel with the inductor L1. The product of these additonal resistances is also approximately equal to $R_o^2$. In the above example, the small series resistance and large shunt resistance were 121 and 6800 ohms, respectively. The scope of this invention is therefore to be determined from the attached claims rather than from the above detailed descriptions of preferred embodiments thereof.

What is claimed is:
1. A variable equalizer comprising:
an amplifier circuit having an input terminal receiving unequalized signals, having a forward gain loop, having a feedback loop, and having an output terminal from which equalized signals are coupled;
first and second constant resistance networks in said forward and feedback loops, respectively, of said amplifier; and
means for terminating said first and second networks in associated impedances having values which vary in an opposite manner.
2. Apparatus according to claim 1 wherein each network is a two-port device having one port in series with an associated forward gain and feedback loop and having an other port terminated by an associated variable impedance of said last-named means.
3. Apparatus according to claim 2 wherein said terminating impedances are resistances which vary in a manner such that as one terminating resistance increases, the other terminating resistance decreases.
4. Apparatus according to claim 3 wherein said last-named means comprises first and second thermistors producing associated resistances terminating said first and second networks, respectively.
5. Apparatus according to claim 4 including a power source and wherein said amplifier circuit comprises a transistor having a base electrode receiving unequalized signals, and having emitter and collector electrodes connected through associated one ports of said second and first networks, respectively, to said power source, the equalized signals being coupled from said collector electrode.
6. Apparatus according to claim 1 wherein said last-named means terminates said networks in associated resistances that vary differentially.
7. In a system with correction circuitry for equalizing a transmission circuit including a transmission line of prescribed length, a variable line equalizer for equalizing the transmission circuit when it includes a line of length that is different from the prescribed length, comprising:
an amplifier circuit having an input terminal receiving an unequalized signal on the line, having a forward gain loop, having a feedback loop, and having an output terminal from which equalized signals are coupled;
first and second constant resistance networks in associated forward gain and feedback loops of said amplifier circuit; and
means for terminating said networks in impedances which vary in an opposite manner and as a function of the length of line which may be different from the prescribed length.
8. The equalizer according to claim 7 wherein said first and second constant resistance networks are two-port devices having their one ports being terminated by associated variable impedances of said last-named means and having their other ports in series in associated forward gain and feedback loops, respectively; input impedances across the other ports being such that the sum of the decibel measure of the input impedance of said first network and the reciprocal of the decibel measure of the input impedance of said second network is substantially complementary to the decibel measure of the net loss characteristic of the correction circuitry and transmission circuit for equalizing lengths of transmission line which may be different from the prescribed length.
9. The equalizer according to claim 7 wherein said constant resistance networks are two-port devices, each network having one port terminated by an associated terminating impedance which is a resistance provided by said last-named means and having an input impedance across an other port thereof, the net gain of said amplifier circuit being proportional to the product of the input impedance of said first network and the reciprocal of the input impedance of said second network, this product being approximately equal to the complement of the net loss characteristic of the correction circuitry and transmission circuit including lengths of line which may be different from the prescribed length.
10. The equalizer according to claim 9 wherein said terminating resistances vary differentially.
11. The equalizer according to claim 10 wherein said terminating resistances are produced by associated first and second thermistors.
12. The equalizer according to claim 9 including a power source and wherein said amplifier circuit comprises a transistor having a collector electrode electrically connected through the other port of said first network to said power source, having a base electrode receiving unequalized input signals, and having an emitter electrode connected through the other port of said second network to said power source.
13. The equalizer according to claim 9 wherein at least one of said networks is a bridged-T device comprising: a series arm including first and second resistors electrically connected in series between first terminals of said one and other ports, respectively; a bridging arm including the parallel combination of a first capcitor and third resistor connected between said first terminals of said one and other ports; and a shunt arm in- cluding the series combination of a fourth resistor and an inductor electrically connected between the junction of said first and second resistors and said power source, one of said termiating resistances being connected across the one port.

14. The equalizer according to claim 13 wherein said one network comprises a fifth resistor electrically connected in parallel with the terminating resistance across the one port thereof.

15. The equalizer according to claim 13 including a sixth resistor, said third resistor being electrically connected in parallel with the series combination of said first capacitor and said sixth resistor; and a seventh resistor electrically connected in parallel with said inductor.

16. A variable equalizer comprising:
first and second constant resistance networks;
means for terminating said networks with associated resistances which vary in an opposite manner; and
an amplifier circuit having a forward gain loop receiving unequalized signals and including said first network, having a feedback loop including said second network, and having an output terminal from which equalized signals are coupled.

* * * * *